(12) United States Patent
Ohya

(10) Patent No.: US 7,475,977 B2
(45) Date of Patent: Jan. 13, 2009

(54) INK-JET RECORDING METHOD

(75) Inventor: Hidenobu Ohya, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 324 days.

(21) Appl. No.: 11/113,877

(22) Filed: Apr. 25, 2005

(65) Prior Publication Data

US 2005/0200672 A1 Sep. 15, 2005

Related U.S. Application Data

(63) Continuation of application No. PCT/JP2005/002980, filed on Feb. 24, 2005.

(30) Foreign Application Priority Data

Mar. 9, 2004 (JP) ............................. 2004-065281

(51) Int. Cl.
*G01D 11/00* (2006.01)

(52) U.S. Cl. ....................... 347/100; 347/95; 106/31.27

(58) Field of Classification Search ................. 347/100, 347/95, 96, 101; 106/31.27, 31.13, 31.6; 523/160
See application file for complete search history.

(56) References Cited

U.S. PATENT DOCUMENTS

| | | | | |
|---|---|---|---|---|
| 2,759,939 | A * | 8/1956 | Peter et al. ..................... | 546/75 |
| 6,481,841 | B1 * | 11/2002 | Blease et al. ................. | 347/100 |
| 2002/0011178 | A1 * | 1/2002 | Kanke et al. ............. | 106/31.47 |
| 2002/0050225 | A1 * | 5/2002 | Mafune et al. ........... | 106/31.27 |
| 2003/0061963 | A1 * | 4/2003 | Blease et al. ............. | 106/31.27 |
| 2004/0134383 | A1 * | 7/2004 | Matsumoto et al. ......... | 347/100 |

* cited by examiner

*Primary Examiner*—Manish S Shah
(74) *Attorney, Agent, or Firm*—Lucas & Mercanti, LLP

(57) ABSTRACT

An ink-jet recording method employing a magenta ink containing an anthrapyridone dye as a principal dye, wherein the reflective spectrum of the magenta image having a density of from 0.9 to 1.1 recorded by the magenta ink satisfies the condition defined by the following Expression 1, in which $OD_{max}$ is a reflective density at the maximum absorption wavelength and $OD_{430}$ is a reflective density at 430 nm, $$0.20 \leq OD_{430}/OD_{max} \leq 0.35. \quad \text{Expression 1}$$

2 Claims, 2 Drawing Sheets

INK-JET RECORDING METHOD

CROSS REFERENCE OF RELATED APPLICATION

This is a continuation of International Application PCT/JP2005/002980 filed Feb. 24, 2005, which in turn claimed the priority of Japanese Patent Application No. JP2004-065281 filed Mar. 9, 2004, both of which are incorporated herein by reference.

FIELD OF TECHNOLOGY

This invention related to a novel ink-jet recording method.

TECHNICAL BACKGROUND

Recently, the quality of the ink-jet image is raised to a level so called as photographic image quality accompanied with considerable progress in the ink-jet technology raises, together with the progress in the technology of printer, ink and the exclusive recording medium. Accompanied with the improvement in the image quality, the durability of the ink-jet image becomes to be compared with that of the usual silver salt photographic image, and weak points on the discoloring properties such as the lightfastness and the fastness to oxidant gas are pointed out.

It is present status that the quality of the ink-jet image has not been attained to comparable to the silver salt photographic prints in the discoloration even tough many investigations have been performed for improving the discoloration.

As a trial for improving the discoloration, it is much tried to raise the fastness of the dye itself, but the level of the fastness is insufficient.

Hitherto, xanthene type dyes and H acid azo dyes have been employed as the magenta dye. These dyes have problem that the anti-discoloration ability is low.

As the countermeasure to such the problem, inks employing an anthrapyridone type dye are disclosed in, for example, Japanese Patent Tokkai Hei 10-305221 and 11-29714, Tokkai 2000-191660, 2000-256587, 2001-72884, 2001-139836, 2001-288091, 2002-332418, 2002-332429 and 2003-55589. However, it is present status that the image quality is not satisfactory when compared with that in the silver salt photographic image, even though some degree of improvement in the discoloration is obtained by the anthrapyridone dyes.

Inks employing an anthrapyridone type dye having specific structure has been proposed, which are improved in the hue, visivility, lightfastness and water proof ability (cf. for example, Patent Documents 1 and 2). Moreover, ink-jet inks improved in the hue and the lightfastness by the combination use of the anthrapyridone type resin and another water-soluble dye are proposed (cf. for example, Patent Document 3). Though the lightfastness can be improved some degree by the simple application of the anthrapyridone dye, the quality of the image is not satisfactory regarding the fastness to the oxidant gas when compared with that of the silver salt photographic image.

On the other hand, the graininess of the image, particularly in the low density portion of the image, is considerably improved by the use of inks having the same hue and different in the color density from each other so called as light and deep color inks, but any receipt and design of the inks preferably for raising the durability of the image is not disclosed. In the case of the anthrapyridone dye, it is known that the durability of the image in the low density area, which is particularly weak, is improved by entirely employing the anthrapyridone dye in the light color ink. However, the H acid azo dye is usually employed in the deep color ink as a principal dye and any ink set in which the anthrapyridone is principally employed in both of the deep and light color inks is not known yet.

Accordingly, an ink-jet recording method is demanded, by which a print having sufficient fastness against light and oxidant gas compared with the silver salt photographic print can be obtained.

[Patent Document 1] Tokkai 2000-109464
[Patent Document 2] Tokkai 2003-192930
[Patent Document 3] Tokkai 2003-138188

DISCLOSURE OF THE INVENTION

Problems to be Solved by the Invention

An object of the invention is to provide an ink-jet recording method by which a print like as a silver salt photographic print excellent in the fastness to light and oxidant gas and hue can be obtained, particularly to provide a ink-jet recording method, an ink and an ink set giving a high image durability in the full range of from the low density to the high density when the magenta ink is the combination of two or more kind of inks different from each other in the color density. Further the invention provides an ink-jet recording method, an ink and an ink set giving high durability at a medium density range, for example, a reflective density of from 0.9 to 1.1 of the image formed by both of the light and deep colored inks.

It is found by the inventors that the fastness of color can be further improved by the principal presence of the anthrapyridone dye in the image. In other words, it is important that the anthrapyridone dye is not mixed with another azo type magenta dye. In the case of using the ink set of the deep colored ink and the light colored ink, it is particularly difficult to improve the fatness at the intermediate density near a density of 1.0 since both of the light and deep colored inks are jetted in the area having near a density of 1.0 so that the amount of the inks is increased. According to the found by the inventor, it is useful to employ the anthrapyridone dye also in the deep colored ink additionally in the light colored ink.

It is supposed that an intermolecular mutual relation is raised so that the fastness is improved by the occurrence of the molecular aggregation. The fastness is considerably raised not only the concentration of the anthrapyridone dye on the image but the image is formed by the later-proposed method by which the aggregation of the anthrapyridone may be accelerated. Moreover, a bronzing prevention effect can be simultaneously obtained by applying such the method.

Means for Solving the Problem

The object of the invention is attained by the following constitution.

(1) An ink-jet recording method for recording an image on a recording medium employing a magenta ink containing an anthrapyridone dye as a principal dye, wherein the reflective spectrum of the magenta image having a density of from 0.9 to 1.1 recorded by the magenta ink satisfies the condition defined by the following Expression 1, in which $OD_{max}$ is a reflective density at the maximum absorption wavelength and $OD_{430}$ is a reflective density at 430 nm, $$0.20 \leq OD_{430}/OD_{max} \leq 0.35. \qquad \text{Expression 1}$$

(2) An ink-jet recording method for recording an image on a recording medium employing a magenta ink containing an anthrapyridone dye as a principal dye wherein an aggregation product of the anthrapyridone dye is formed on the recording medium.

(3) An ink-jet recording method for recording an image on a recording medium employing a magenta ink containing an anthrapyridone dye as a principal dye, wherein the recording medium contains a water-soluble multi-valent metal salt in an amount of not less than 0.4 g/m².

(4) An ink-jet recording method for recording an image of a recording medium employing two or more kinds of magenta inks, wherein at least one of the anthropyridone dyes is a compound represented by the following Formula 1,

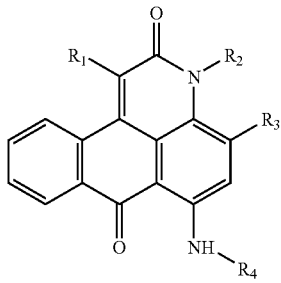

in the formula, $R_1$ is an acyl group, an acyloxy group or a carbamoyl group; $R_2$ and $R_3$ are each a hydrogen atom or a substituent; and $R_4$ is an aromatic ring or an aromatic hetero cyclic ring.

(5) An ink-jet recording method for recording an image on a recording medium employing two or more kinds of magenta inks, wherein all of the inks contain an anthrapyridone dye as a principal dye each and at least one of the anthrapyridone dyes is constituted by bonding plural skeletons of anthrapyridone dye.

(6) An ink set containing two or more kinds of magenta inks, wherein the magenta ink having the highest light absorbance among the magenta inks contains an anthrapyridone dye as a principal dye and has a light absorbance of not less than 600 and less than 1200.

(7) An ink set including two or more kinds of magenta inks, wherein all of the inks contain an anthrapyridone dye as a principal dye and at least on of the anthrapyridone dye is a compound represented by the forgoing Expression 1.

(8) An ink set containing two or more kinds of magenta inks, wherein all of the inks contain an anthrapyridone dye as a principal dye each and at least one of the anthrapyridone dyes is constituted by bonding plural skeletons of anthrapyridone dye.

(9) A magenta ink containing an anthrapyridone dye as a principal dye, wherein the reflective spectrum of the magenta image having a density of from 0.9 to 1.1 recorded on a recording medium containing a water-soluble multi-valent metal salt by the magenta ink satisfies the condition defined by the following Expression 1, in which $OD_{max}$ is a reflective density at the maximum absorption wavelength and $OD_{430}$ is a reflective density at 430 nm, $$0.20 \leq OD_{430}/OD_{max} \leq 0.35. \quad \text{Expression 1}$$

Effects of the Invention

An ink-jet recording method can be provided by the invention, by which an ink-jet print excellent in the fastness to light and oxidant gas and high hue.

BRIEF DESCRIPTION OF THE INVENTION

THE BEST EMBODIMENT OF THE INVENTION

Figure 1:
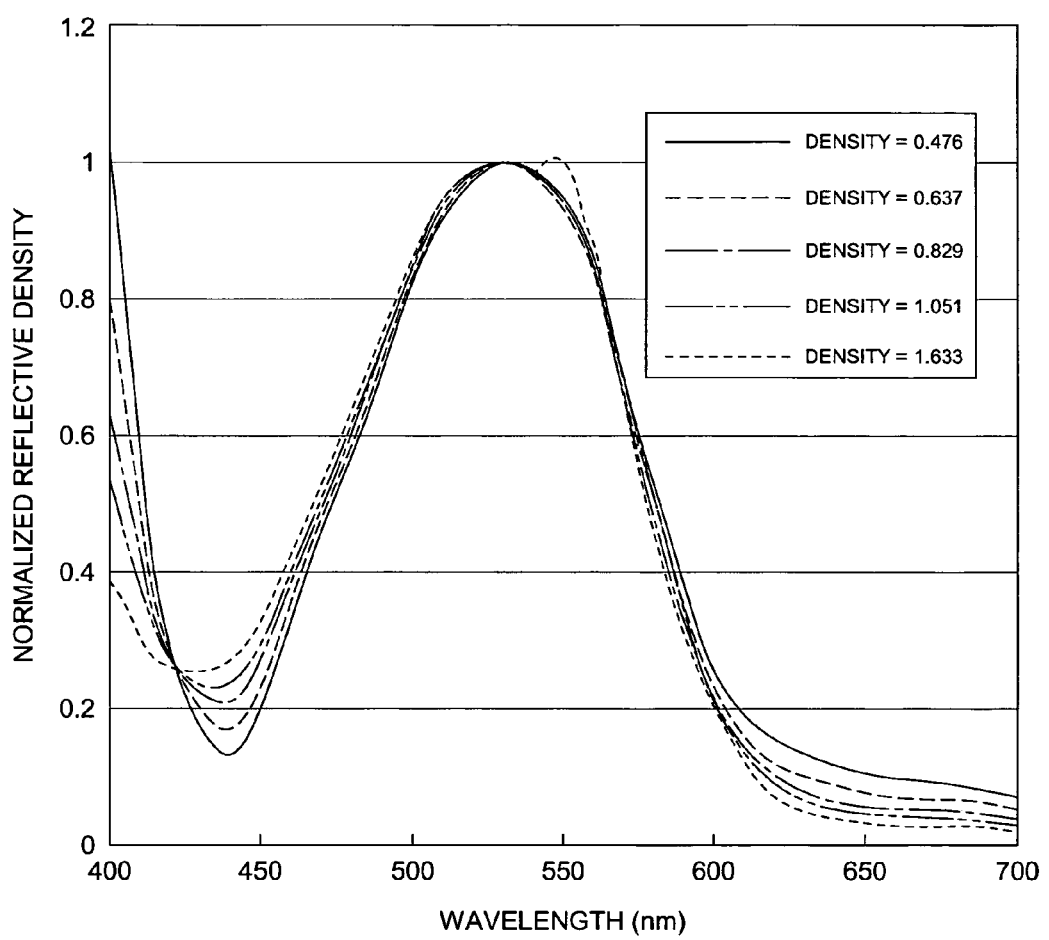
FIG. 1 shows a graph displaying the spectrum of reflective density.

The best embodiment of the invention is described below.

Improvement in the discoloration of various magenta inks each containing various anthrapyridone dyes as a principal dye is investigated by recording images on various kind of recording medium. As a result of the investigation, it is found that the discoloration is considerably improved by a combination of a recording medium and a magenta ink containing the anthrapyridone dye as a principal dye so that the ratio ($DO_{430}/OD_{max}$) of the reflective density at a wavelength of 430 nm $OD_{430}$ to the reflective density at the maximum absorbing wavelength $OD_{max}$ is made to not less than 0.2 in the reflective absorption spectrum measured at a magenta image having a density of from 0.9 to 1.1. The discoloring is further improved when the ratio is not less than 0.25. It is found that, however, when the ratio $DO_{430}/OD_{max}$ exceeds 0.35, the hue of the color is lowered since the absorption in the shorter wave side becomes higher than that at main absorption of the magenta color and bronzing is caused, such the status is not preferred.

Tough mechanism of the improvement in discoloration by making the ratio of the reflective density at 430 nm to $OD_{max}$ to the specific value is not cleared at the present time yet, it is supposed that the interaction of the dye molecules is strengthen (for example, the formation of aggregation product) and the receiving ability of damage by light and oxidant gas is lowered than that of the molecular state so that the discoloration fastness is raised. Namely, it is presumed that the characteristic of the reflection spectrum derived from the aggregated product appears at 430 nm. About the improvement in the anti-discoloring ability by the formation of the aggregated product, such the effects on the copper phthalocyanine is reported in, for example, Tokkai 2003-212167. However, there is no reported example on the anthrapyridone and the relation with the reflective density in the specific area (a blue portion of 430 nm) is not known also.

In the ink-jet recording method of the invention, as the method for strengthening the interaction of the anthrapyridone such as forming the aggregation product or method for controlling the $OD_{430}/OD_{max}$ into the range of from not less than 0.20 and less than 0.35, for example, controlling in the kind of anthrapyridone dye as a principal dye, the concentration of the dye in the magenta ink, and the kind and the adding amount of the organic solvent in the magenta ink are applicable.

As to the kind of the anthrapyridone dye, it is preferred to select from the compounds represented by Formula. 1 for enhancing the effects of the invention. Moreover, the dyes constituted by bonding plural skeletons of the anthrapyridone are preferable for enhancing the effects of the invention. It is supposed that the interaction of the dye molecules is strengthened and the formation of the aggregation product is accelerated by the use of such the dyes.

The dye concentration in the magenta ink is preferably made higher as long as the hue is not considerably lowered. It is preferable for enhancing the effects of the invention to raise the ratio of the anthrapyridone in the magenta ink. In concrete, the entire contents of the anthrapyridone dye in the ink is not less than 60%, preferably not less than 80%, further preferably not less than 90%, and most preferably not less than 95%, by weight of the entire magenta dyes. It is supposed that that the interaction of the dye molecules is strengthened by raising the ratio of the anthrapyridone dye and the formation of the aggregation product is accelerated.

The kind and the amount of the organic solvent in the magenta ink are preferably selected considering the solubility of the anthrapyridone. A polyvalent alcohol having a high dissolving ability to the anthrapyridone dye in an amount of largely exceeding the amount necessary to stably dissolve the dye in the ink is preferably employed for enhancing the effects of the invention. In concrete, it is preferable to make the content of glycerol to not more than 15%; glycerol is usually used in a large amount.

The status of the dye can be controlled also by the recording medium, particularly, by that containing a poly-valent metal salt in the ink receiving layer thereof. Moreover, the control also can be carried out by providing a controlling agent in the course of, before or after the printing. As the controlling agent, 1) a compound having a tertiary or quaternary amino group; the compound, preferably a polymer, and further preferably a water-soluble polymer is useful, for example, a polyamine and its salt are preferably employed, and 2) the later-mentioned poly-valent metal salt particularly aluminum chloride, aluminum sulfate, magnesium chloride, magnesium sulfate calcium chloride and zirconium acetate are preferable. The providing method of a controlling liquid containing the controlling agent may be 1) a method in which the liquid is provided at least a part of the recording medium before the printing, 2) a method in which the liquid is provided at least a part of the recording medium after the printing and 3) a method in which the liquid is provided to at least a part of the recording medium from a recording head other than the head for the recording ink simultaneously with the jetting of the recording ink.

Figure 2:
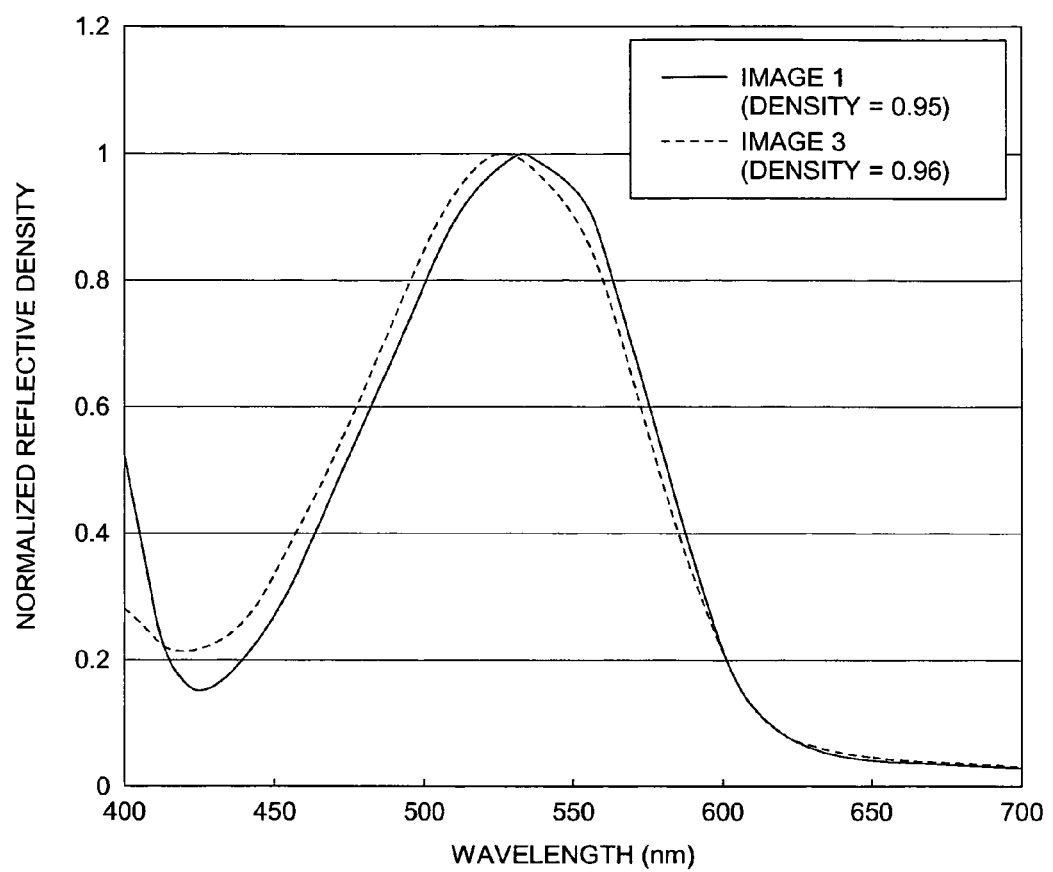
FIG. 2 shows a graph displaying the spectrum of reflective density.

In the invention, the aggregation of the anthrapyridone dye can be detected by the following method. A wedge image of magenta is prepared and the reflection spectra of each of the images of different density are measured. Variation in the reflection spectrum is observed sometimes when the above measured spectra are normalized and compared. In FIG. 1, the reflection spectra of the images with a density of 0.476, 0.637, 0.829, 1.051 and 1.633 of Image 5 of the later-mentioned example are compared by overlapping after the normalization. It is understood that the reflection spectrum is varied depending on the image density. In concrete, variation of the reflectance at 400 nm, 430 nm, 550 mn and 650 nm are observed. The formation of the aggregation product can be confirmed by the clear variation in the reflection spectrum. Particularly, it is found in the invention that the variation of the reflectance at 430 nm relates to the durability of the image, accordingly to use the variation of reflectance at 430 nm as the indicator of the aggregation is effective. In FIG. 2, Image 1 and Image 3 of the examples are compared after the normalization. The comparison displays that the aggregation ability is varied depending on the recording medium even when the same ink is employed. The reflection spectrum at 430 nm of Image 3 is different form that of Image 1. It is understood that the aggregation is formed in Image 3 by referring FIG. 1.

The anthrapyridone dye relating to the invention is described below.

The "principal dye" in the invention is the anthrapyridone dye accounting not less than 60% by weight of the entire magenta dyes when the magenta ink contains plural types of magenta dye. When the discoloration property is considered, the ratio of the anthrapyridone is preferably not less than 80%, further preferably not less than 90%, and most preferably not less than 95%, by weight.

When a kind of ink containing the anthrapyridone dye as a principal dye is employed such as in the above 1), the ink having a light absorbance of not less than 600 and less than 1200 is preferably employed. The light absorbance is more preferably not less than 600 and less than 1000. In the invention, the light absorbance of the ink is a light absorbance at the maximum absorbance within the range of from 500 nm to 600 nm. Though the anthrapyridone dyes employable in the magenta ink according to the invention include those described in Tokkai Hei 10-306221 and 11-29714, and Tokkai 2000-109464, 2000-191660, 2000-256587, 2001-72884, 2001-139836, 2001-288091, 2002-332418, 2002-332419, 2003-55589 and 2003-192930, the compounds represented by Formula 1 are preferable.

In Formula 1, $R_1$ is an acyl group such as an acetyl group, a propanoyl group, a benzoyl group and a pyridinecarbonyl group, an acyloxy group such as an ethoxycarbonyl group and phenoxycarbonyl group, and a carbamoyl group such as a carbamoyl group, an ethylcarbamoyl group and a phenylcarbamoyl group. $R_2$ and $R_3$ are each a hydrogen atom or a substituent. $R_4$ is an aromatic ring or an aromatic heterocyclic ring. The above-described groups each may have a substituent.

Particularly preferable dye is one in which $R_1$ is an acyl group and $R_2$ is an alkyl group.

The types of dye having a skeleton constituted by bonding plural skeletons of anthrapyridone dye with together can be preferably employed.

Examples of the anthrapyridone dye, including ones represented by Formula 1, are listed below, but the invention is not limited to them.

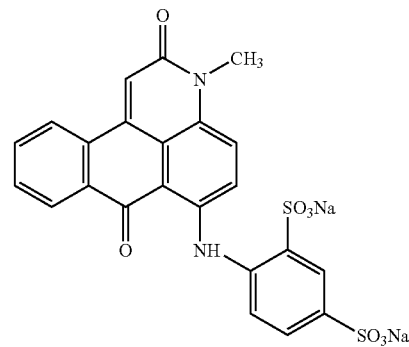

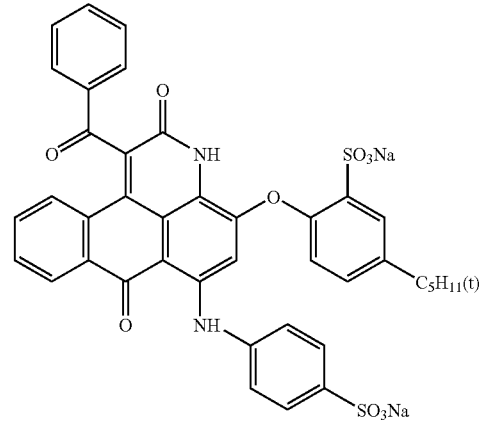

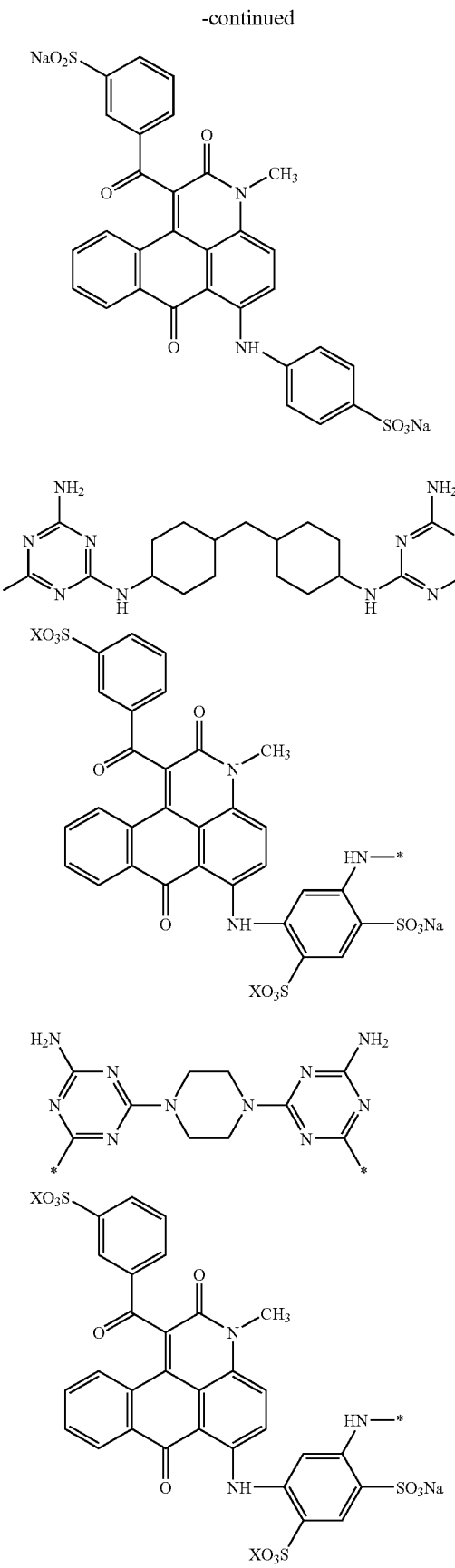
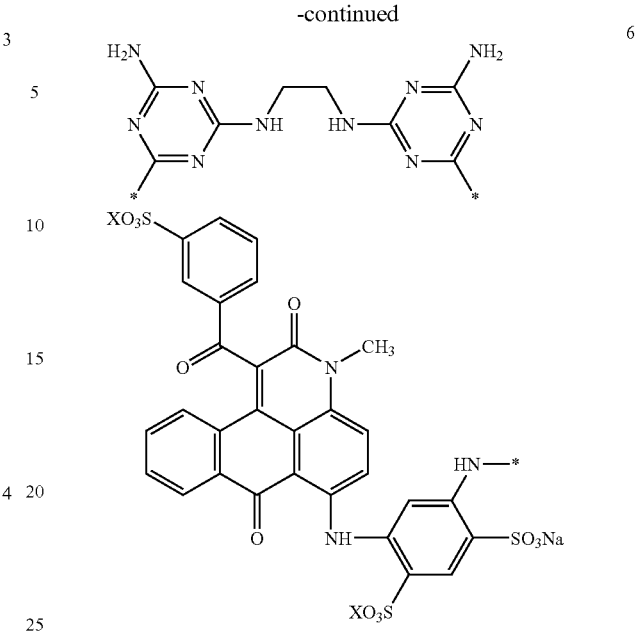

In the above compounds 4, 5 and 6, the asterisk position of the lower formula is bonded to each of the two asterisk positions of the upper formula. X is a counter ion, particularly a Na ion.

Another constituent of the ink relating to the invention is described below.

In the ink-jet recording method according to the invention, the magenta ink and another color ink other than the magenta ink containing the anthrapyridone dye relating to the invention may be employed. In such the inks, known water-soluble dyes, for example, an azo dye, a methane dye, an azomethine dye, a xanthene dye, a quinine dye, a phthalocyanine dye, a triphenylmethane dye and diphenylmethane dye can be used. As concrete compounds of the dyes, those exemplified in Tokkai 2002-264490 can be cited.

An organic solvent can be contained in the magenta ink relating to the invention and the other inks. Though any specific limitation on the organic solvent, a water-soluble organic solvent such as an alcohol, a poly-valent alcohol, a polyvalent alcohol ether, an amine, an amide and a heterocyclic compound, is preferable. As concrete compounds, water-soluble organic solvents exemplified in Tokkai 2001-231832 can be cited.

Various kinds of surfactant can be employed in the magenta ink relating to the invention and the other inks. Though there is no specific limitation on the surfactant employable in the invention, an anionic surfactant such as a dialkylsulfosuccinate, an alkylnaphthalenesulfonate and a fatty acid salt, a nonionic surfactant such as polyoxyethylene alkyl ether, an acetylene glycol, and a polyoxyethylene-polyoxypropylene block copolymer, and a cationic surfactant such as an alkylamine salt and a quaternary ammonium salt are employable. Particularly, the anionic surfactant and the nonionic surfactant are preferably employed.

In the magenta ink relating to the invention and the other inks, various kinds of known additive such as a viscosity controlling agent, a specific resistance controlling agent, a film forming agent, a UV absorbent, an antioxidant, an anti-fading agent, an anti-mould agent and a rust preventive can be suitably selected for use according to the purpose of the improvement of various properties such as the stabilization of jet, the suitability to print head and ink cartridge, the stability of storage and the durability of image. Examples of the additive include a fine particle of oil such as liquid paraffin, dioctyl phthalate, tricresyl phosphate and silicone oil, UV absorbent described in Tokkai Sho 57-74192, 57-87988 and 62-261476, discoloration preventing agents described in Tokkai Sho 57-74192, 57-87989, 60-72785 and 61-146591, and Tokkai Hei 1-95091 and 3-13376, and fluorescent whitening agents described in Tokkai Sho 59-42883, 59-52689, 62-280069 and 61-242871 and Tokkai Hei 4-219266.

The magenta ink relating to the invention and the other inks are preferably have a surface tension of not more than 40 mN/m, and more preferably from 20 to 40 mN/m, for obtaining stable extrusion of jet, high glossiness and raising the anti-ozone property. The viscosity of the inks is preferably from 1.5 to 10 mPa·s, and more preferably from 3.0 to 8 mPa·s in the same reason.

Tough various kinds of paper such as usual paper, coated paper and executive glossy paper can be employed as the recording medium in the ink-jet recording method of the invention, a preferable recording medium is one composed of a water proof support such as resin coated paper and film and a porous ink absorbing layer principally composed of an inorganic fine particle and a binder provided on the support, and high glossy one is particularly preferable for enhancing the effects of the invention. Among them, a recording medium in which a silica fine particle is employed as the inorganic fine particle is particularly preferable from the viewpoint of glossiness, ink absorbing ability and the durability of the image formed thereon.

The recording medium relating to the invention preferably contains a water-soluble poly-valent metal salt in an amount of not less than 0.4 g/m$^2$.

The poly-valent metal salt employable in the invention can be selected, for example, from magnesium, calcium, strontium, cobalt, nickel, copper, zinc zirconium and aluminum. A water-soluble poly-valent metal salt is particularly preferable and aluminum, magnesium, calcium and zirconium are particularly preferred. In concrete, aluminum chloride, aluminum sulfate, magnesium chloride, magnesium sulfate, calcium chloride and zirconium acetate can be employed.

The adding amount of the water-soluble poly-valent metal salt of from 0.4 g/m$^2$ to 2.0 g/m$^2$ in terms of weight of the poly-valent metal salt is preferable since the $OD_{430}/OD_{max}$ in the invention can be controlled within the desired range and the improvement in the lightfastness can be attained. When the adding amount is less than 0.2 g/m$^2$, the sufficient synergistic effect with the magenta ink containing the anthrapyridone dye as a principal dye can not be obtained. The amount of exceeding 2 g/m$^2$ is not preferred since lowering in the color formation and bronzing are resulted.

A recording medium having a porous ink absorbing layer principally composed of the silica fine particle and the binder and containing not less than 0.4 g/m$^2$ of the water-soluble poly-valent metal salt is preferable as the recording medium relating to the invention.

For adding the water-soluble poly-valent metal salt relating to the invention to the recording medium, a method in which an aqueous solution of the poly-valent metal salt is provided to the recording medium and dried and a method in which the metal salt is added to the recording medium coating liquid are applicable.

The printer capable of being employed in the ink-jet recording method of the invention is one having an ink-jet recording medium storing means, a conveying means, an ink cartridge and an ink-jet printing head similar to a printer available on the market, the printer further may have a providing means for a colorless ink. Furthermore, a printer having a roll-shaped recording medium storing means, a cutting means, a print classifying means and a print receiving means is advantageous for commercially applying the ink-jet photographic prints.

As the recording head, a piezo system, a thermal system and continuous system may be also applied, and the piezo system is preferable from the viewpoint of stability of jetting of the ink.

In the ink-jet recording method according to the invention, polymer fine particles may be contained in the recording ink or the colorless ink. In such the case, at least one of processes of heating the recording medium before of after the recording and heating or pressing the print after recording can be applied for accelerating film formation by the polymer fine particles.

EXAMPLES

The invention is concretely described referring examples below, but the invention is not limited to the examples.

<<Preparation of Ink Set of Deep and Light Colored Inks>>

[Preparation of Magenta Ink Set 1]

(Preparation of Light Magenta Ink 1)

| | |
|---|---|
| Magenta dye (Exemplified Compound 1) | An amount necessary for making the light absorbance to 300 |
| Diethylene glycol | 10% by weight |
| Glycerol | 10% by weight |
| Triethylene glycol monobutyl ether | 10% by weight |
| Surfinol 465 (Air Products Co., Ltd.) | 0.5% by weight |
| Purified water to make to | 100% by weight |

(Preparation of Deep Magenta Ink 1)

| | |
|---|---|
| Magenta dye (Exemplified Compound 1) | An amount necessary for making the light absorbance to 850 |
| Diethylene glycol | 10% by weight |
| Glycerol | 10% by weight |
| Triethylene glycol monobutyl ether | 10% by weight |
| Surfinol 465 (Air Products Co., Ltd.) | 0.5% by weight |
| Purified water to make to | 100% by weight |

[Preparation of Magenta Ink Sets 2 through 8]

Magenta Ink Sets 2 through 8 were prepared in the same manner as Magenta Ink Set 1 except that the kinds of the magenta dye and the light absorbance of the deep and light colored inks were varied to as described in Table 1.

(Preparation of Magenta Ink 9)

| | |
|---|---|
| Magenta dye (Exemplified Compound 4) | An amount necessary for making the light absorbance to 900 |
| Diethylene glycol | 10% by weight |
| Glycerol | 10% by weight |
| Triethylene glycol monobutyl ether | 10% by weight |
| Surfinol 465 (Air Products Co., Ltd.) | 0.5% by weight |
| Purified water to make to | 100% by weight |

[Preparation of Magenta Ink Set 10]

Magenta Ink Set 10 was prepared in the same manner as in Magenta Ink Set 1 except that the magenta dye in the deep colored ink was replaced by the following Comparative Dye 1.

[Comparative Dye 1]

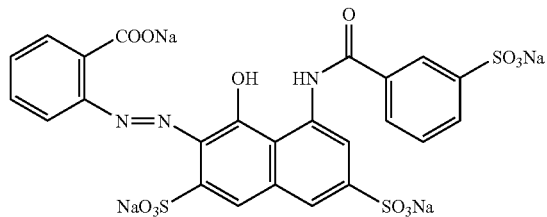

[Measurement of the Light Absorbance of Ink]

The light absorbance of the ink was measured by a spectrophotometer V-530 manufactured by Nihon Bunko-sha Co., Ltd., using the suitably diluted ink.

<<Preparation of Recording Medium>>

[Preparation of Recording Medium 1]

An ink receiving layer coating liquid having the following constitution was coated and dried on a resin coat paper having a thickness of 220 μm so that the coating amount was to be that described in Table 1 to prepare Lower Layer 1. The coated material was referred to as Recording Medium 1. On the occasion of the preparation, a suitable amount of a surfactant and boric acid were added.

| (Ink receiving layer coating liquid) | |
|---|---|
| Silica by gas phase method Aerosil 300 (average diameter of primary particle: 7 nm, Nihon Aerosil Kogyo Co., Ltd.) | 22.0 g/m² |
| Poly(vinyl alcohol) PVA235 (Kraray Co., Ltd.) | 4.1 g/m² |
| Cationic polymer P-1 | 1.8 g/m² |
| Cationic polymer P-1 $$-(CH_2-\underset{COOCH_3}{\underset{|}{\overset{CH_3}{\overset{|}{C}}}})_{30}- \quad -(CH_2-\underset{COOC_2H_5}{\underset{|}{\overset{CH_3}{\overset{|}{C}}}})_{30}- \quad -(CH_2-\underset{COOC_2H_4\overset{+}{N}-CH_3}{\underset{|}{\overset{CH_3}{\overset{|}{C}}}})_{40}-\underset{Cl^-}{\underset{|}{CH_3}}\underset{}{CH_3}$$ Mn = 13000 | |

[Preparation of Recording Medium 2]

On the ink receiving layer of above prepared Recording Medium 1, poly(aluminum chloride) HAC-25, manufactured by Tagi Kagaku Co., Ltd., was over-coated so that the amount of the solid ingredient was to be 0.35 g/m² to form a surface layer and dried the solvent to prepare Recording Medium 2.

[Preparation of Recording Medium 3]

On the ink receiving layer of above prepared Recording Medium 1, poly(aluminum chloride) HAC-25, manufactured by Tagi Kagaku Co., Ltd., was over-coated so that the amount of the solid ingredient was to be 0.50 g/m² to form a surface layer and dried the solvent to prepare Recording Medium 3.

[Preparation Recording Medium 4]

On the ink receiving layer of above prepared Recording Medium 1, poly(aluminum chloride) HAC-25, manufactured by Tagi Kagaku Co., Ltd., was over-coated so that the amount of the solid ingredient was to be 0.70 g/m² to form a surface layer and dried the solvent to prepare Recording Medium 4.

[Preparation Recording Medium 5]

On the ink receiving layer of above prepared Recording Medium 1, poly(aluminum chloride) HAC-25, manufactured by Tagi Kagaku Co., Ltd., was over-coated so that the amount of the solid ingredient was to be 0.80 g/m² to form a surface layer and dried the solvent to prepare Recording Medium 5.

<<Ink-Jet Image Recording>>

The above prepared ink set was charged into corresponding ink tanks of the ink cartridge of Ink-jet Printer PM-740DU, manufactured by Seiko-Epson Co., Ltd. A magenta wedge image (an image containing 8 density steps in which the first step was low density and the eighth step was high density) was output by the above printer to obtain Images 1 through 13.

<<Evaluation on the Output Image>>

[Evaluation on Lightfastness]

The above-obtained magenta wedge image having a density of about 1.0 was irradiated by light of 70,000 lx for 200 hours by a xenon fade meter C: 65 Xenon Weather Meter, manufactured by Atlas Co., Ltd. The reflective density of the image having a density of about 1.0 was measured before and after the irradiation and the remaining ratio in percent of the density was calculated according to the following expression.

Remaining ratio of density (%)=(Image density after irradiation/Image density before irradiation)×100

[Evaluation on Resistivity to Oxidant Gas]

The above-obtained magenta wedge image having a density of about 1.0 was exposed to ozone with a concentration of 5 ppm for 40 hours by an ozone gas testing machine Ozone Weather Meter OMS-H, manufactured by Suga Shiken Kikai Co., Ltd. After that, the reflective density of the image having a density of about 1.0 was measured before and after the exposure to ozone and the remaining ratio in percent of the density was calculated according to the above expression.

[Evaluation of the Anti-Bronzing Ability]

Occurrence of bronzing at the portion having a reflective density of about 1.5 of the above-prepared magenta image was visually observed and the anti-bronzing ability was evaluated according to the following norms.

3: Occurrence of bronzing was almost not observed.
2: Occurrence of bronzing was slightly observed.
1: Bronzing occurred considerably.

[Measurement of Hue]

The above-obtained magenta wedge image having a density of about 1.0 was measured by an optical densitometer X-rite938, manufactured by X-rite Co., Ltd., and a*b* in the L*a*b* system defined by CIE1976 were calculated by the following expression to determine the hue C*.

$$C^* = [(a^*)^2 + (b^*)^2]^{1/2}$$

[Measurement of $OD_{430}/OD_{max}$]

A reflection spectrum in the range of from 400 to 700 nm of a part of the above-prepared magenta wedge image having a reflective density of about from 0.9 to 1.1 was measured by a spectral photometer 320, manufactured by Hitachi Seisakusho Co., Ltd. The reflective density at the maximum absorption wavelength $OD_{max}$ and that at a wavelength of 430 nm $OD_{430}$ were determined from the spectrum and the ratio $OD_{430}/OD_{max}$ was calculated.

[Confirmation of Occurrence of Aggregation]

The occurrence of the aggregation of the dye was confirmed by the foregoing detecting method.

Results obtained by the above are listed in Table 1.

TABLE 1

| | Magenta ink set | | | | | | | Result of evaluation and measurement | | | | | |
| --- | --- | --- | --- | --- | --- | --- | --- | --- | --- | --- | --- | --- | --- |
| | Light colored ink | | Deep colored ink | | Recording medium | | | Occurrence of association | Light-fastness (%) | Oxidant gas resistivity | Anti-bronzing ability | Hue | Remarks |
| Image No. | No. | Kind of dye | Light absorbency | No. | Kind of dye | Light absorbency | No. | Polyvalent metal | OD430/ODmax | | | | |
| 1 | 1 | 1 | 300 | 1 | 850 | 1 | — | 0.18 | None | 35 | 30 | 3 | 78 | Inv. |
| 2 | 1 | 1 | 300 | 1 | 850 | 2 | 0.35 | 0.22 | Occurred | 45 | 46 | 3 | 77 | Inv. |
| 3 | 1 | 1 | 300 | 1 | 850 | 3 | 0.5 | 0.26 | Occurred | 58 | 60 | 3 | 79 | Inv. |
| 4 | 2 | 2 | 300 | 2 | 900 | 3 | 0.5 | 0.27 | Occurred | 60 | 60 | 3 | 78 | Inv. |
| 5 | 3 | 1 | 360 | 1 | 850 | 1 | — | 0.25 | Occurred | 52 | 49 | 3 | 78 | Inv. |
| 6 | 3 | 1 | 360 | 1 | 850 | 3 | 0.5 | 0.26 | Occurred | 61 | 59 | 3 | 79 | Inv. |
| 7 | 4 | 3 | 300 | 3 | 800 | 3 | 0.5 | 0.26 | Occurred | 62 | 71 | 3 | 77 | Inv. |
| 8 | 5 | 4 | 300 | 4 | 800 | 3 | 0.5 | 0.27 | Occurred | 65 | 83 | 3 | 83 | Inv. |
| 9 | 6 | 4 | 350 | 4 | 850 | 3 | 0.5 | 0.28 | Occurred | 75 | 88 | 3 | 82 | Inv. |
| 10 | 7 | 3 | 500 | 3 | 900 | 4 | 0.7 | 0.32 | Occurred | 68 | 72 | 2 | 77 | Inv. |
| 11 | 8 | 1 | 600 | 1 | 900 | 5 | 0.8 | 0.36 | Occurred | 48 | 51 | 1 | 72 | Inv. |
| 12 | 9 | — | — | 4 | 900 | 2 | 0.35 | 0.31 | Occurred | 82 | 90 | 2 | 78 | Inv. |
| 13 | 10 | 1 | 300 | *1 | 850 | 2 | 0.35 | 0.18 | None | 20 | 15 | 2 | 78 | Comp. |

*1: Comparative Dye 1
Inv.: Inventive
Comp.: Comparative

As is shown in Table 1, the images according to the invention are superior to the comparative image in the lightfastness, resistivity to oxidant gas and anti-bronzing ability, and good in the hue.

The invention claimed is:

1. An ink set having two or more kinds of magenta inks, wherein all of the two or more kinds of the magenta ink contain the anthrapyridone dye each as a principal dye and at least one of the anthrapyridone dye has a skeleton formed by bonding plural anthrapyridone skeletons, wherein one of the magenta inks having the highest light absorbance among the two or more kinds of magenta inks and has a light absorbance of not less than 600 and less than 1,200.

2. An ink set having two or more kinds of magenta inks, wherein all of the two or more kinds of the magenta ink contain the anthrapyridone dye each as a principal dye and at least one of the anthrapyridone dye has a skeleton formed by bonding plural anthrapyridone skeletons, wherein the reflective spectrum of a magenta image having a density of from 0.9 to 1.1 recorded by the magenta inks satisfies the condition defined by the following Expression 1, in which $OD_{max}$ is a reflective density at the maximum absorption wavelength and $OD_{430}$ is a reflective density at 430 nm, $$0.20 \leq OD_{430}/OD_{max} \leq 0.35. \quad \text{Expression 1}$$

* * * * *